United States Patent
Hellgren

(10) Patent No.: US 11,124,087 B2
(45) Date of Patent: Sep. 21, 2021

(54) SYSTEM AND A METHOD FOR SELECTING ENERGY STORAGE CELLS FOR BALANCING OF AN ELECTRICAL ENERGY STORAGE PACK

(71) Applicant: VOLVO TRUCK CORPORATION, Gothenburg (SE)

(72) Inventor: Jonas Hellgren, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 137 days.

(21) Appl. No.: 16/463,479

(22) PCT Filed: Dec. 1, 2016

(86) PCT No.: PCT/EP2016/079404
§ 371 (c)(1),
(2) Date: May 23, 2019

(87) PCT Pub. No.: WO2018/099560
PCT Pub. Date: Jun. 7, 2018

(65) Prior Publication Data
US 2019/0359080 A1    Nov. 28, 2019

(51) Int. Cl.
*B60L 58/22*    (2019.01)
*B60L 50/60*    (2019.01)
(Continued)

(52) U.S. Cl.
CPC .............. *B60L 58/22* (2019.02); *B60L 50/60* (2019.02); *B60L 58/13* (2019.02); *B60L 58/15* (2019.02);
(Continued)

(58) Field of Classification Search
CPC .......... B60L 58/15; B60L 58/13; B60L 50/60; B60L 58/22; B60L 2200/18;
(Continued)

(56) References Cited

U.S. PATENT DOCUMENTS 10,005,446 B2 * 6/2018 Jeong ..................... B60W 10/08
10,267,863 B2 * 4/2019 Heiries ................ G01R 31/396
(Continued)

OTHER PUBLICATIONS

International Search Report and Written Opinion dated Sep. 5, 2017 in International Application No. PCT/EP2016/079404.

*Primary Examiner* — M Baye Diao
(74) *Attorney, Agent, or Firm* — Venable LLP; Jeffri A. Kaminski

(57) ABSTRACT

The invention relates to a method for selecting candidate energy storage cells for balancing of an electrical energy storage pack (1) comprising a plurality of energy storage cells (3). The method comprises calculating (S212) a probability that a balancing action on the selected group of cells results in that at least one of the future state of charge is lower than a lower threshold present state of charge or higher than a higher threshold present state of charge, the probability being indicative of superfluous leakage or overcharging. The probability is based on the future state of charge for each of the cells and on the statistical inaccuracy. If the probability is indicative of that superfluous leakage or overcharging is unlikely to occur, selecting (S214, S214') the group of cells as candidates for a balancing action. The invention further relates to a corresponding system and to a vehicle.

21 Claims, 6 Drawing Sheets

(51) Int. Cl.
*H01M 10/42* (2006.01)
*B60L 58/15* (2019.01)
*B60L 58/13* (2019.01)

(52) U.S. Cl.
CPC ....... *H01M 10/425* (2013.01); *B60L 2200/18* (2013.01); *H01M 2010/4271* (2013.01); *H01M 2220/20* (2013.01)

(58) Field of Classification Search
CPC .. B60L 2240/547; B60L 58/14; B60L 3/0069; H01M 10/425; H01M 2010/4271; H01M 2220/20; Y02E 60/10; Y02T 10/70; B60Y 2200/92; B60Y 2200/91; B60Y 2200/14
USPC ......................................................... 320/109
See application file for complete search history.

(56) References Cited

U.S. PATENT DOCUMENTS

| | | | |
|---|---|---|---|
| 10,833,513 B2* | 11/2020 | Coenen | ................ G01R 31/392 |
| 2004/0228417 A1* | 11/2004 | Kennedy | ........... H04L 25/03159 |
| | | | 375/260 |
| 2006/0097698 A1 | 5/2006 | Plett | |
| 2012/0290234 A1 | 11/2012 | Schaefer | |
| 2014/0327400 A1 | 11/2014 | Kudo et al. | |
| 2015/0231985 A1 | 8/2015 | Li | |

* cited by examiner

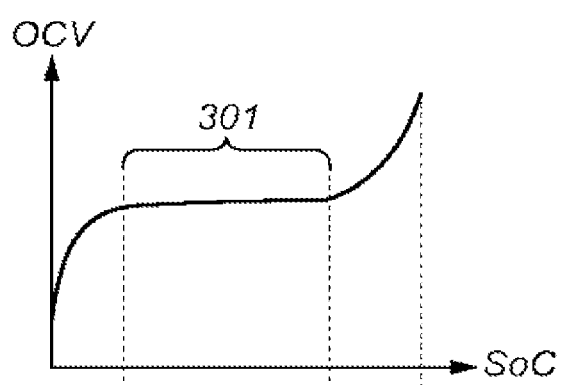
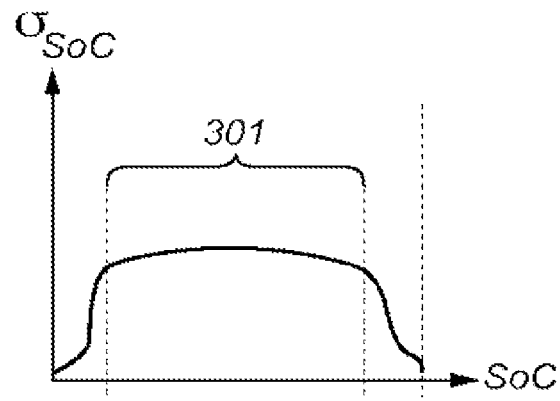
Fig. 3a                    Fig. 3b
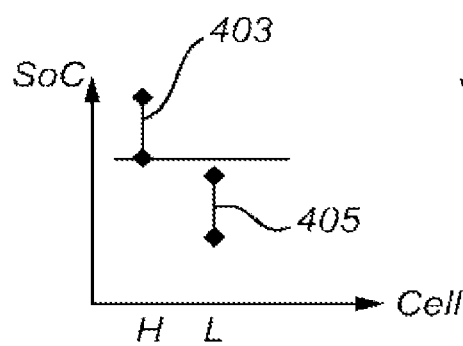
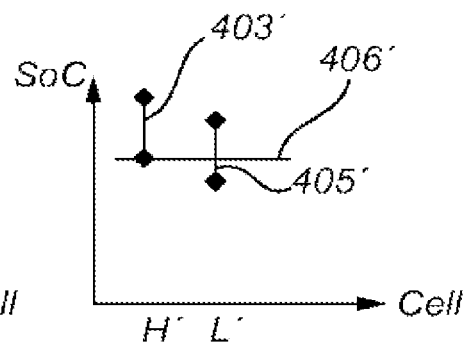
Fig. 4a                    Fig. 4b

SYSTEM AND A METHOD FOR SELECTING ENERGY STORAGE CELLS FOR BALANCING OF AN ELECTRICAL ENERGY STORAGE PACK

TECHNICAL FIELD

The invention relates to a device/method for selecting energy storage cells for balancing of an electrical energy storage pack and to a corresponding system and to a vehicle.

The invention can be applied in any hybrid or electrical vehicles. Although the invention will be described with respect to an electrical bus, the invention is not restricted to this particular vehicle, but may also be used in other hybrid or electrical vehicles such as electrical trucks, electrical construction equipment, and electrical cars.

BACKGROUND

Batteries are becoming a more common source of power for providing propulsion for vehicles. Such batteries are most often rechargeable batteries and consist of several battery cells that may be connected in series and/or in parallel forming a complete battery pack for the vehicle. The quality of the battery pack is highly dependent on the quality of each battery cell setting tough requirements on the production quality of the battery cells. However, the battery cells may nevertheless have somewhat different capacities despite the high quality and may also age differently due to e.g. different operating temperature of each battery cell. In addition, differences in the dynamics of the individual battery cells, for example self-discharge between cells, lead to an uneven charge level distribution of the battery pack.

Overall, the state of charge for the battery cells will eventually drift apart leading to an uneven state-of-charge distribution which limits the operation performance for the battery pack. For example the discharge capabilities of the battery pack will be limited by the battery cell with the lowest state of charge which thus limits the performance of the entire battery pack.

In order to avoid the uneven distribution of state of charge selected battery cells may be charged or discharged in order to equalize the state of charge of the battery cells, this process is also known as balancing. US2006/0097698 discloses a method for cell equalization for equalizing the state of charge of a battery pack in order to maximize the available power from the battery pack. The method disclosed by US2006/0097698 is based on ranking the state of charge of the battery cells and depleting charge or adding charge to battery cells according to the ranking.

However, estimations of state of charge of battery cells of a battery pack are associated with an estimation error which complicates equalization of the battery pack. Thus, it is difficult to determine the relative state of charge between battery cells accurately. The equalization method proposed in for example US2006/0097698 does not take such considerations into account. Accordingly, there is room for improvement with regards to balancing of a battery pack.

SUMMARY

An object of the invention is to provide a method and a system for selecting candidate energy storage cells for balancing of an electrical energy storage pack, whereby selecting the candidate energy storage cells is based on a probability for avoiding superfluous leakage or overcharging of the candidate cells. The object is at least partly achieved by a method according to claim 1.

According to a first aspect of the invention, there is provided a method for selecting candidate energy storage cells for balancing of an electrical energy storage pack comprising a plurality of energy storage cells for an electric vehicle, the method is comprising the steps of: a) estimating a state of charge for each of the energy storage cells; b) selecting a group of energy storage cells from the plurality of energy storage cells; c) estimating a future state of charge for each of the energy storage cells in the selected group, the future state of charge resulting from a balancing action of the respective energy storage cell; d) calculating a statistical inaccuracy for each of the estimated future state of charge; e) determining a lower threshold present state of charge among the plurality of energy storage cells, or determining a higher threshold present state of charge among the plurality of energy storage cells; f) calculating a probability that a balancing action on the selected group of energy storage cells results in that at least one of the future state of charge is lower than the lower threshold present state of charge, the probability thereby being indicative of superfluous leakage, the probability being based on the future state of charge for each of the energy storage cells and on the statistical inaccuracy, or calculating a probability that a balancing action on the selected group of energy storage cells results in that at least one of the future state of charge is higher than the higher threshold present state of charge, the probability thereby being indicative of overcharging for at least one energy storage cell, the probability being based on the future state of charge for each of the energy storage cells and on the statistical inaccuracy, wherein g) if the probability is indicative of that superfluous leakage or overcharging is unlikely to occur, selecting the group of energy storage cells as candidates for a balancing action, and repeating steps b) to g) for a further group of energy storage cells, wherein the steps b) to e) are repeated for a plurality of further groups.

Accordingly, a group of electrical energy storage cells are selected for which a future state of charge is estimated. The future state of charge for the selected energy storage cells are checked against a probability condition indicative of that the future state of charge is lower than a lower threshold state of charge or larger than a higher threshold state of charge. The probability condition includes a statistical inaccuracy of the estimated future state of charge. Only if the probability indicates that the future state of charge of the selected energy storage cells does not result in an overcharged energy storage cell or superfluous leakage is the group of selected cells selected as candidates for a balancing action. Which cells are selected for the actual balancing action is determined in a subsequent process.

A balancing action may be charging or discharging of the energy storage cell. Charging includes adding electrical charge from an external source of energy or from an energy recovery system, or from redistribution of charge among the plurality of energy storage cells. Discharging includes removing charge by e.g. a bleed circuit or from redistribution of charge among the plurality of energy storage cells.

The invention is based on the realization that energy storage cells may not be subject to balancing if there is a risk of superfluous leakage or overcharging of the cell. Superfluous leakage means that an initially high state of charge cell becomes a cell having lower state of charge than an initially low state of charge cell. It is realized that the selection of cells that may be subject to balancing is selected based on a probability that superfluous leakage of overcharging occurs. With this method, balancing can advantageously be performed even for a vehicle in operation, which provides less need for balancing when the vehicle is not operative, thereby providing increased operation time for the vehicle. The method may be continuously running as long as the vehicle is operative or the energy storage pack is operative for balancing.

It should be noted that it is possible to execute the method only with the superfluous leakage case independent of the overcharging case or vice versa.

The group of energy storage cells may be a single energy storage cell, or a plurality of energy storage cells.

According to one embodiment, the lower threshold present state of charge may be the present state of charge of one of the energy storage cells not being in the selected group. In other words, the lower threshold present state of charge may be in a range of state of charge not being included in the selected group of energy storage cells. In particular, according to another embodiment of the invention, the lower threshold present state of charge may be the minimum present state of charge among the plurality of energy storage cells. Thereby, superfluous leakage is avoided with higher certainty. Superfluous leakage particularly means that an initially high state of charge cell becomes a cell having lower state of charge than the initially lowest state of charge cell. Furthermore, the higher present state of charge is the maximum present state of charge among said plurality of energy storage cells.

Alternatively, the lower threshold present state of charge may be a predetermined state of charge threshold level which may be a state of charge value higher than the minimum state of charge, or lower present state of charge may alternatively be based on the average of state of charge of a threshold number of energy storage cells having among the lowest state of charge of the energy storage pack, e.g. the 10% of the cells with the lowest state of charge.

Similarly, the higher present state of charge may be a predetermined state of charge value which may be lower than or higher than the highest state of charge of the energy storage cells, or the higher present state of charge may be based on an average state of charge being the average of state of charges for energy storage cells having highest state of charge of the energy storage pack, e.g. the average of the 10% of the cells with the highest state of charge Preferably, the higher present state of charge is lower or equal to a theoretically highest state of charge.

According to one embodiment, selecting the group of energy storage cells may comprise selecting a threshold number of energy storage cells with the highest state of charge. For example, first the energy storage cell having the highest state of charge is selected and tested according to the method. Next, the two cells having highest state of charge is selected and tested as a group according to the method. By selecting the cells having the highest state of charge avoids unnecessary testing of cells having lower state of charge than high state of charge cells, thereby obtaining a more efficient selection of candidate cells since some combinations of cells are not tested. For example, it would not be advantageous to leak (e.g. discharge) a cell which does not have highest state of charge at the same time as not leaking the cell having the highest state of charge.

In one embodiment, the group of energy storage cells may instead be randomly selected.

According to one embodiment, the method may comprise: creating a binary string comprising ones for selected energy storage cells and zeroes for energy storage cells among the plurality of cells that are not selected, and storing the binary strings that representative of the groups of energy storage cells that are selected as candidates for a balancing action. Thereby, an advantageously and straight-forward way of representing selected cells among the plurality of cells is provided. For example, a binary string being [1 0 0 0 0 . . . 0] means that the only a first cell (the "1") is selected to be tested according to the probability condition, whereas [1 1 0 0 0 0 0 . . . 0] means a first and a second cell is selected as the group of cells. The method provides a means of finding a set of binary strings which all represents candidates for a balancing action.

According to one embodiment, the method may comprise calculating a power leak loss for the energy storage pack associated with balancing of the energy storage pack; calculating a penalty function indicative of the state of balance for the electrical energy storage pack, the penalty function being proportional to the state of balance for a present state of balance that exceeds a threshold state of balance, minimizing a cost function being a combination of the power leak loss and the penalty function. The cost function is minimized with the selected energy storage cells as input, i.e. with the state of charge of the selected energy storage cells as input. Minimizing the cost function provides that a balance between power losses associated with balancing of the energy storage pack and the state of balance should be achieved. The penalty function ($\epsilon$) may be a value which is a function of the state of balance for the entire energy storage pack.

According to one embodiment, the probability may be a constraint for the minimizing of the cost function, whereby only selected groups of energy storage cells for which the probability is indicative of that superfluous leakage is unlikely to occur are used as input for the cost function. In other words, only the selected group(s) is/are used as input to the process of finding the optimal set of leaking cells, the set being determined by the cost function. This advantageously improves avoiding overcharging of cells or superfluous leakage of the energy storage pack. Selected candidate cells may form a binary string used as a control variable for the cost function.

According to one embodiment, the energy storage pack is balanced according to the cost function.

The object is at least partly achieved also by a system according to claim 10.

According to a second aspect of the invention, there is provided a system for selecting candidate energy storage cells for balancing of an electrical energy storage pack comprising a plurality of energy storage cells for an electric vehicle, the system comprising a battery management unit comprising means for determining a state of charge of the energy storage cells wherein the battery management unit is configured to: a) estimate a state of charge for each of the energy storage cells; b) select a group of energy storage cells from the plurality of energy storage cells; c) estimate a future state of charge for each of the energy storage cells in the selected group, the future state of charge resulting from a balancing action of the respective energy storage cell; d) calculate a statistical inaccuracy for each of the estimated future state of charge e) determine a lower threshold present state of charge among the plurality of energy storage cells, or determining a higher threshold present state of charge among the plurality of energy storage cells; f) calculate a probability that a balancing action on the selected group of energy storage cells results in that at least one of the future state of charge is lower than the lower threshold present state of charge, the probability thereby being indicative of superfluous leakage, the probability being based on the future state of charge for each of the energy storage cells and on the statistical inaccuracy, or calculate a probability that a balancing action on the selected group of energy storage cells results in that at least one of the future state of charge is higher than the higher threshold present state of charge, the probability thereby being indicative of overcharging for at least one energy storage cell, the probability being based on the future state of charge for each of the energy storage cells and on the statistical inaccuracy, wherein g) if the probability is indicative of that superfluous leakage or overcharging is unlikely to occur, select the group of energy storage cells as candidates for a balancing action, and h) repeat steps b) to g) for a further group of energy storage cells, wherein the steps b) to e) are repeated for a plurality of further groups.

The battery management unit may be configured to: create a binary string comprising ones for selected energy storage cells and zeroes for energy storage cells among the plurality of energy storage cells that are not selected, and store the binary strings that representative of the groups of energy storage cells that are selected as candidates for a balancing action.

Further, the battery management unit may be configured to: calculate an power leak loss for the energy storage pack associated with balancing of the energy storage pack; calculate a penalty function indicative of the state of balance for the electrical energy storage pack, the penalty function being proportional to the state of balance for a present state of balance that exceeds a threshold state of balance, minimize a cost function being a combination of the power leak loss and the penalty function.

According to one embodiment, the system may further comprise a discharging unit configured to: discharge selected energy storage cells to balance the energy storage pack to a state of charge level according to the cost function.

According to one embodiment the battery management unit may comprise a control unit and an electronic storage unit.

An energy storage cell may be a Li-ion battery cell, although other battery cells known in the art would be equally applicable.

Effects and features of the second aspect of the invention are largely analogous to those described above in connection with the first aspect.

There is further provided a vehicle comprising an energy storage pack comprising a plurality of energy storage units; and a system according to the second aspect.

The vehicle may be an electrical, hybrid, or plug-in hybrid vehicle comprising an electrical engine, wherein the energy storage pack provides power to the electrical engine for providing propulsion for the electrical, hybrid, or plug-in hybrid vehicle.

Furthermore, there is provided a computer program comprising program code means for performing the steps of any of the embodiments of the first aspect when the program is run on a computer.

Furthermore, there is provided a computer readable medium carrying a computer program comprising program code means for performing the steps of any of the embodiments of the first aspect when the program product is run on a computer.

Additionally, there is provided a control unit for controlling selecting candidate energy storage cells for balancing of an electrical energy storage pack comprising a plurality of energy storage cells for an electric vehicle, the control unit being configured to perform the steps of any of the embodiments of the first aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings:

FIG. 3a conceptually illustrates open circuit voltage versus state of charge for an energy storage cell;

FIG. 3b conceptually illustrates statistical inaccuracy of state of charge versus state of charge for an energy storage cell;

FIG. 4a-b conceptually illustrates a comparison of state of charge of two energy storage cells including the statistical inaccuracy;

DETAILED DESCRIPTION OF EXAMPLE EMBODIMENTS OF THE INVENTION

Figure 1:
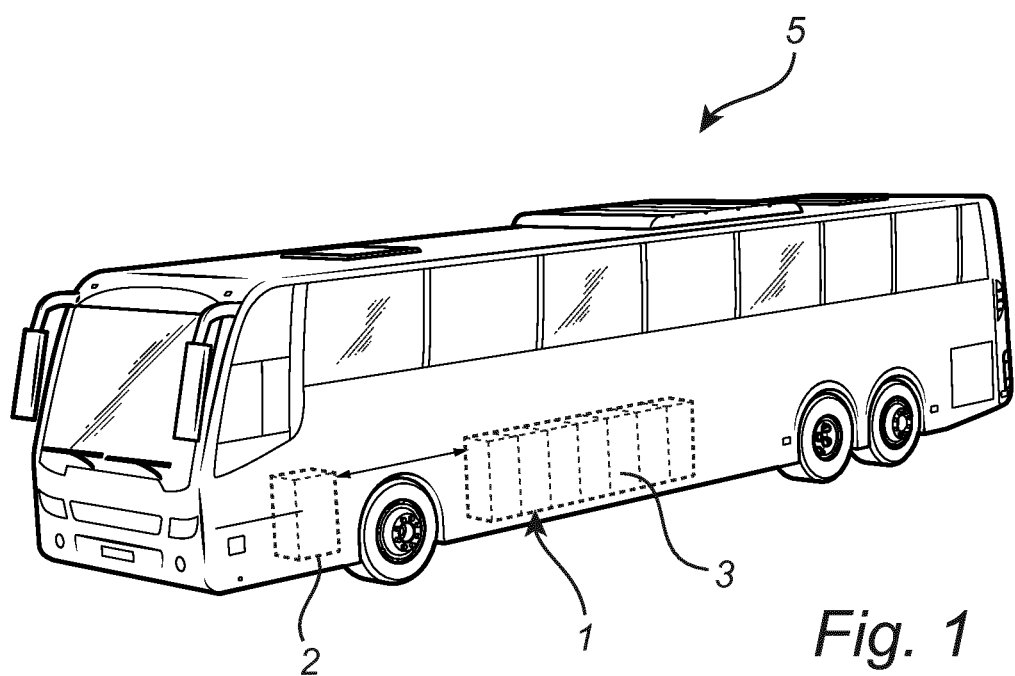
FIG. 1 is a vehicle in the form an electrical bus according to example embodiments of the invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference character refer to like elements throughout the description.

FIG. 1 illustrates a vehicle in the form of an electrical bus 5 comprising an electrical energy storage pack being a battery pack 1 with a plurality of battery cells 3. The battery pack 1 is arranged to provide power to an electrical engine (not shown) arranged for providing propulsion for the electrical bus 5. The electrical buss 5 further comprises a battery management unit 2 which is configured to control a balance action for the battery pack. The battery management unit 2 is further configured to monitor battery cell characteristics such as state of charge and open circuit voltage of the battery cells 3.

Figure 2:
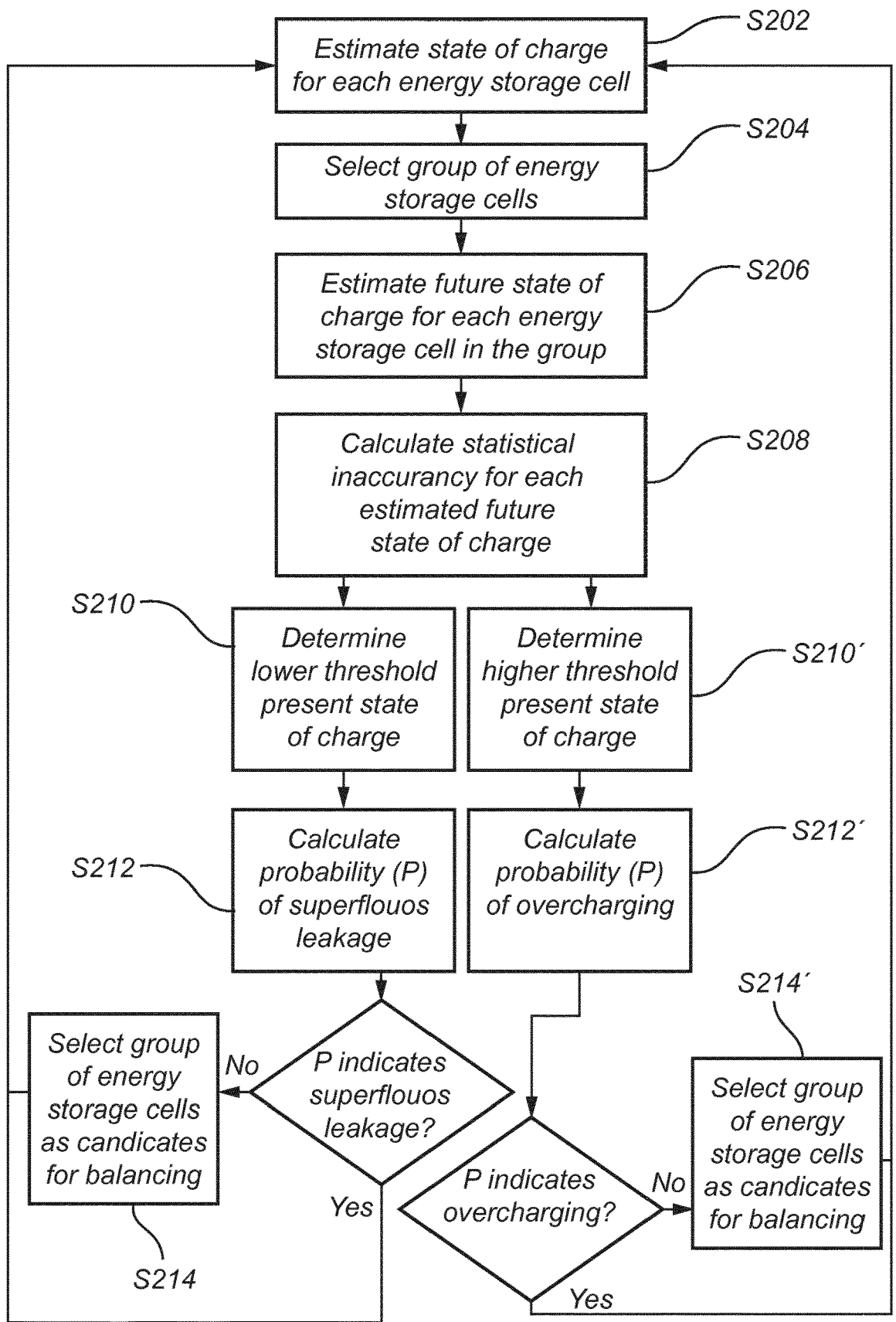
FIG. 2 is a flow-chart of method steps according to embodiments of the invention.

FIG. 2 is a flow chart of method steps according to an embodiment of the invention. In a first step, a state of charge for each of the energy storage cells of an energy storage pack for a vehicle is estimated S202. From the plurality of energy storage cells, a group of energy storage cells is selected S204. This selected group of energy storage cells may be selected based on the state of charge of the energy storage cells. For example, the group of energy storage cells may be the cells with the highest state of charge. A future state of charge for each of the energy storage cells in the selected group is estimated in step S206, the future state of charge resulting from a balancing action of the respective energy storage cell. The balancing action may be charging or discharging of the energy storage cell. Furthermore, a statistical inaccuracy is calculated S208 for each of the estimated future state of charge. The future state of charge may be estimated from a predetermined balancing action, e.g. a predetermined amount of SoC to discharge or charge, or a time of discharging or charging.

Next, at least two possibilities are within the scope of the invention, a first one includes determining S210 a lower threshold present state of charge among the plurality of energy storage cells. Subsequently, a probability is calculated S212 that a balancing action on the selected group of energy storage cells results in that at least one of the future state of charge is lower than the lower threshold present state of charge, the probability thereby being indicative of superfluous leakage, the probability being based on the future state of charge for each of the energy storage cells and on the statistical inaccuracy. If the probability is indicative of that superfluous leakage is unlikely to occur, the group of energy storage cells is selected S214 as candidates for a balancing action. Information regarding the selected group of energy storage cells may be stored for future balancing, or it may be forward directly as a control variable to a cost function controlling the actual balancing. The probability of superfluous leakage is preferably set close to zero to reduce or even eliminate the risk of superfluous leakage. For example, the probability may be set to about 0%, 0.1%, 0.5%, 1%, 1.5%, or 2%.

A second possibility includes determining S210' a higher threshold present state of charge among the plurality of energy storage cells. Subsequently, a probability is calculated S212' that a balancing action on the selected group of energy storage cells results in that at least one of the future state of charge is higher than the higher threshold present state of charge, the probability thereby being indicative of overcharging for at least one energy storage cell, the probability being based on the future state of charge for each of the energy storage cells and on the statistical inaccuracy. If the probability is indicative of that overcharging is unlikely to occur, the group of energy storage cells is selected S214' as candidates for a balancing action. Information regarding the selected group of energy storage cells may be stored for future balancing, or it may be forward directly as a control variable to a cost function controlling the actual balancing.

The method is repeated for a plurality of further groups of energy storage cells. One possibility is that the method is repeated until manually terminated. Another possibility is that the method is repeated as long as the vehicle is operative, i.e. as long as the engine is running or the energy storage module is being charged or discharged by any external means.

FIG. 3a conceptually illustrates open circuit voltage (OCV) versus state of charge (SoC) and FIG. 3b conceptually illustrates the statistical inaccuracy versus state of charge. In FIGS. 3a-b there is indicated a range 301 of state of charge. In this range 301 of state of charge, the open circuit voltage is relatively flat as is shown in FIG. 3a. This means that the accuracy of a state of charge taken within this range 301 of open circuit voltage will be associated with a relatively large statistical inaccuracy. This is illustrated in FIG. 3b in which the same range 301 of state of charge is indicated for the statistical inaccuracy ($\sigma_{SoC}$). The statistical inaccuracy e.g. standard deviation is highest in the range 301 of state of charge where the open circuit voltage is relatively flat. In other words, it is generally difficult to accurately determine the state of charge from the open circuit voltage for a relatively wide range of state of charge, covering a range of a state of charge curve from about 10% state of charge to about 90% state of charge, or from about 30% state of charge to about 60% state of charge.

Now turning to FIGS. 4a-b conceptually illustrating the principle for embodiments of the invention. FIG. 4a-b each shows the level of state of charge (SoC) for two battery cells forming an energy storage pack, one with high state of charge (H) and one with low state of charge (L) with the corresponding error interval 403, 405, 403', and 405'. Assuming first that a balancing action is about to be conducted in the energy storage cells H' and L' in the case shown in FIG. 4b. Consider the case of balancing by discharging the cell with assumed highest state of charge, cell H'. The statistical inaccuracy of the determined state of charge for both cells H' and L' results in an error interval 403' and 405' which overlap in this case as shown in FIG. 4b. In other words, the lowest level 406' of state of charge for the cell H' is within the error interval 405' for the cell L'. Thus, there is a significant risk that by balancing the energy storage pack comprising the cells H' and L' by discharging cell H', the cell H' will have lowest state of charge after the balancing action, this is called superfluous leakage, i.e. that the initially highest state of charge cell H' will have the lowest state of charge after balancing, which is an undesired situation.

Still with reference to FIG. 4b, the same reasoning applies with regards to a balancing action being to add charge (i.e. charging) to the cell L'. Thus, due to the overlapping error intervals 403' and 405', there is a significant risk that by balancing the cells by charging cell L', the cell L' will have highest state of charge after the balancing action, this may lead to unwanted overcharging of the battery cells.

In contrast to FIG. 4b, in FIG. 4a, the error intervals 403 and 405 of the cells with high state of charge H and low state of charge L do not overlap. Thus, the risk for superfluous leakage in the case of discharge balancing action and overcharging in the case of a charge balancing action is small or even negligible so it may be allowed to perform a balancing action.

Figure 5:
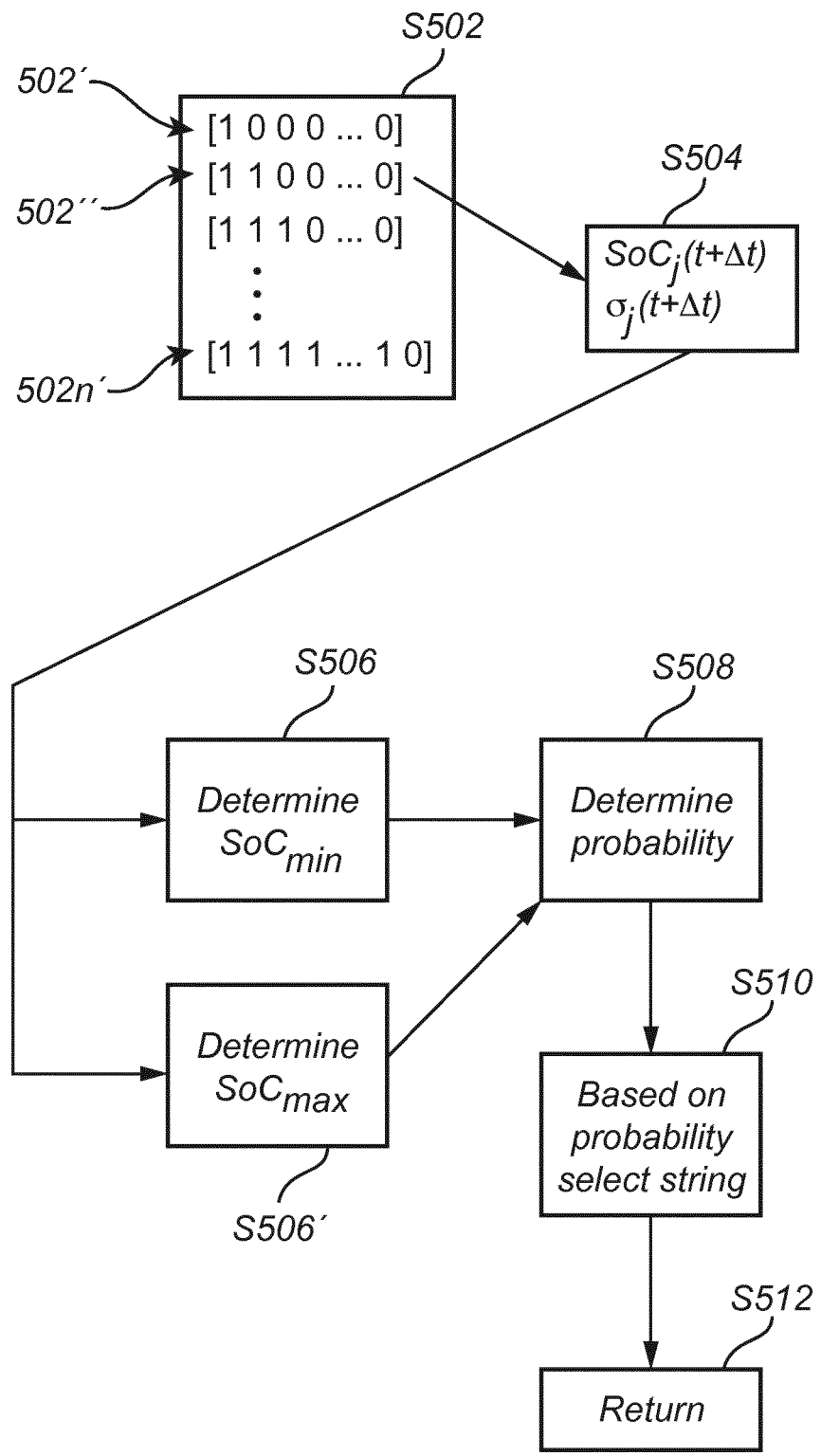
FIG. 5 is a flow-chart of method steps according to embodiments of the invention.

FIG. 5 conceptually illustrates an exemplary embodiment of the invention. Selecting the group of energy storage cells according to step S204 in FIG. 2 may be done in several ways, for example by randomly selecting the cells to be "tested" with the method. Another way is to select the energy storage cells with the highest state of charge. A representation of several selected groups is shown in S502. Each of the binary strings 502'-502n' represents cells with ones (1) for cells with highest state of charge, where the first entry has the highest state of charge and so on. In other words, the energy storage cells of the energy storage pack may be sorted according to the state of charge of each cell. The cells in each binary string 502'-502n' represented by a "1" is part of the selected group of energy storage cells (step S204). Cells represented by a "0" are not part of the selected group of energy storage cells.

A future state of charge ($SoC_j(t+\Delta t)$) as well as the statistical inaccuracy ($\sigma_j(t+\Delta t)$) of the future state of charge are estimated S504 for each ("j") of the energy storage cells in the selected group of energy storage cells. In step S504 the selected group is the cells represented with "1" in binary string 502". For the case of avoiding superfluous leakage a lower threshold state of charge is found. This lower threshold may be the state of charge of one of the energy storage cells not being in the selected group, i.e. represented by a "0". In this particular example, the state of charge of the cell having the lowest state of charge of all the energy storage cells of the energy storage pack is chosen as the $SoC_{min}$ in step S506. Next, in order to determine whether the selected group 502" of energy storage cells are suitable candidates for a balancing action, a probability of superfluous leakage is determined S508. The probability is a probability that at least one of the future states of charge is lower than $SoC_{min}$. The calculated probability is compared with a threshold probability to determine whether or not the selected group of energy storage cells may be candidates for a balancing action, in this case a discharge balancing action. The probability may be given by:

$$1-\Pi_{j\in J}(1-P(SoC_j(t+\Delta t)<SOC_{low}))<P_{dischargethreshold} \quad (1a)$$

where the threshold probability $P_{dischargethreshold}$ is advantageously set close to zero to reduce the risk of superfluous leakage. The "j" represents each energy storage cell in the selected group and "J" all the cells in the selected group. In one embodiment, $SoC_{low}$ is set to the minimum state of charge $SoC_{min}$ (i.e. the state of charge of the energy storage cells having the lowest state of charge). In other embodiments, the $SoC_{low}$ may be a predetermined state of charge threshold level which may be a state of charge value higher than the minimum state of charge, or $SoC_{low}$ may alternatively be based on the average of state of charge of a threshold number of energy storage cells having among the lowest state of charge of the energy storage pack, e.g. the 10% of the cells with the lowest state of charge. If the probability condition in equation 1a is fulfilled, the selected group of energy storage cells are selected S510 as candidates for a balancing action. Thus, the string 502" is selected as a candidate string used in a future balancing action. Next the method returns S512 to select a further group in step S502. Thus, the method determines which of the possible groups of energy storage cells (502', 502", etc.) that may be candidates for a balancing action. In this particular example the balancing action is discharging of energy storage cells.

With further reference to FIG. 5, For the case of avoiding overcharging each of the binary strings 502'-502n' represents cells with ones (1) for cells with lowest state of charge, and a higher threshold state of charge is found. This higher threshold may be the state of charge of one of the energy storage cells not being in the selected group, i.e. represented by a "0". In this particular example, the highest state of charge among the energy storage cells is chosen as the $SoC_{max}$ in step S506'. In other words, $SoC_{max}$ is the highest state of charge of the energy storage cells in the energy storage pack. Next, in order to determine whether the selected group 502' of energy storage cells are suitable candidates for a balancing action, a probability of overcharging is determined S508. The probability is a probability that at least one of the future states of charge is higher than $SoC_{max}$. The calculated probability is compared with a threshold probability to determine whether or not the selected group of energy storage cells may be candidates for a balancing action, in this case a charging balancing action. The probability may be given by:

$$1-\Pi_{j\in J}(1-P(SoC_j(t+\Delta t)<SOC_{high}))<P_{chargethreshold} \quad (1b)$$

where the threshold probability $P_{threshold}$ is advantageously set close to zero to reduce the risk of superfluous leakage. In one embodiment, $SoC_{high}$ is set to the maximum state of charge $SoC_{max}$. In other embodiments, $SoC_{high}$ may be a predetermined state of charge value which may be lower than or higher than the highest state of charge of the energy storage cells, or $SoC_{high}$ may be based on an average state of charge being the average of state of charges for energy storage cells having highest state of charge of the energy storage pack, e.g. the average of the 10% of the cells with the highest state of charge Preferably, $SoC_{high}$ is lower or equal to a theoretically highest SoC. If the probability condition in equation 1b is fulfilled, the selected group of energy storage cells are selected S510 as candidates for a balancing action. Next the method returns S512 to select a further group. Thus, the method determines which of the possible groups of energy storage cells (502', 502", etc.) that may be candidates for a balancing action, in this particular example the balancing action is charging of energy storage cells.

Figure 6:
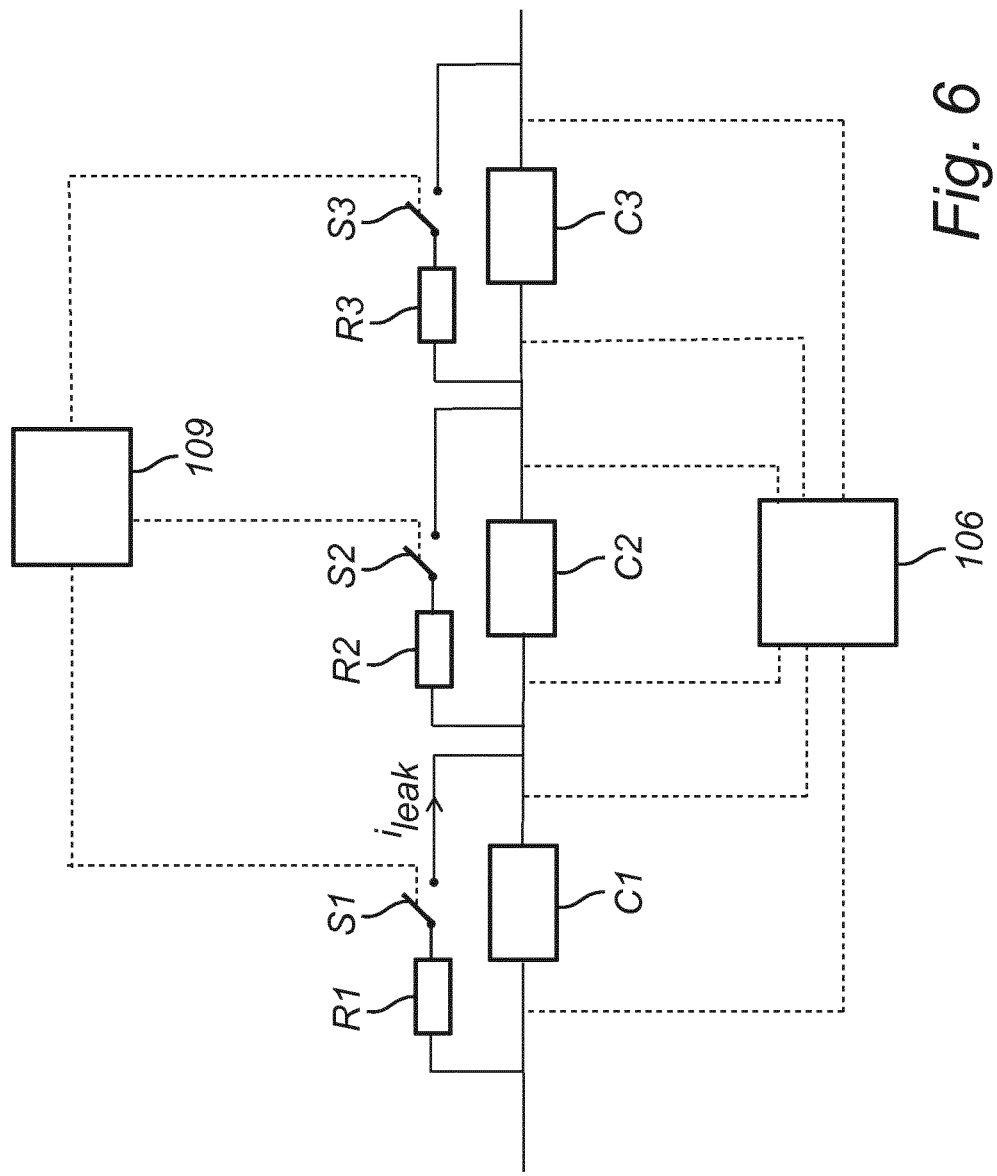
FIG. 6 conceptually illustrates energy storage cells in a discharging circuit.

Now turning to FIG. 6 disclosing three energy storage cells C1, C2, C3 connected to a cell balancing unit 109 being at least part of control unit 108 (see FIG. 7) and a sensor unit 106. It is obvious that an energy storage pack 1 to be used for example in a vehicle comprises a larger number of cells, typically in the magnitude of 50-500 cells, and that all cells are designed in a similar manner as those shown in FIG. 6. For simplicity, however, FIG. 6 only shows three such energy storage cells C. In addition, there may be more than one energy storage pack aboard a vehicle. The method may be utilized on one or more of these energy storage packs.

A first energy storage cell C1 shown in FIG. 6 is arranged with a resistor R1 coupled in parallel with the energy storage cell C1. The purpose of the resistor R1 is to allow an electric current to pass through the resistor R1 during a process of cell balancing. In order to accomplish this, the resistor R1 is coupled in series with a controllable switch S1. As indicated in FIG. 6, the switch S1 is connected to the cell balancing unit 109 which forms at least part of the control unit 108 (also indicated in FIG. 7). In this manner, the switch S1 can be set either in a closed state in which current may pass through the resistor R1, or in an open state in which no current may pass through the resistor R1. A leak current $i_{leak}$ is consequently generated in the event that the switch S1 is set in its closed state. For this reason, the resistor R1 can be referred to as a "leak resistor". During cell balancing, one or more suitable switches are closed in order to improving the total cell balance of the energy storage pack.

The remaining energy storage cells, i.e. the cells C2, C3 in FIG. 6 and also all the other cells of the energy storage pack 1 which are not shown as such in FIG. 6, are configured in the same manner as the described cell C1, i.e. with a circuit including a resistor and a controllable switch which is coupled in parallel with the associated energy storage cell. Consequently, each energy storage cell C may give rise to a leak current $i_{leak}$ in the event that a corresponding switch S is closed.

All the controllable switches S1, S2, S3 are connected to the cell balancing unit 109. Also, each switch S1, S2, S3 is set in its open or closed state depending on certain operating conditions relating to a cell balancing procedure, as will be described in detail below.

As mentioned above, there is a desire to arrange the sensor unit 106 so as to provide a measurement of at least one parameter which reflects the state of operation of the energy storage pack 1. For example, there is provided a measurement of the voltage U of each energy storage cell C by means of the sensor unit 106. For this reason, and as shown in FIG. 6, each energy storage cell C are connected to the sensor unit 106 in order to measure the voltage U of each cell C.

The battery management unit 2 (see FIG. 7) according to the invention may be configured for measuring other parameters than the energy storage voltage as indicators of the state of operation of the energy storage pack 1. Purely as examples, such parameters can be the energy storage current I, the energy storage temperature T or the resistance R of each cell C. All these parameters can be used for controlling the status of the energy storage pack 1 and the cell balancing process.

As mentioned above, each cell C1-C3 of the energy storage pack 1 is associated with a resistor R1-R3 (as shown in FIG. 3) which is connected in parallel with the corresponding energy storage cell C1-C3. Also, each resistor R1-R3 is coupled in series with a controllable switch S1-S3 which is connected to the cell balancing unit 109. The cell balancing process may be based on the principle that each switch S1-S3 can be closed or opened in order to discharge the corresponding energy storage cell C1-C3, i.e. so that a leak current $i_{leak}$ flows through the associated resistor R1, R2, R3 upon closing of the switch. By discharging a particular energy storage cell in this manner, the energy storage cell will be forced to change its state of charge (SoC). By balancing for example those cells which have considerably higher SoC than the remaining cells, or those cells which have a considerably higher cell voltage than the remaining cells, the entire energy storage pack 1 will be brought to a condition involving a higher level of cell balancing. As mentioned, this leads to an improved performance of the energy storage pack 1.

The above described hardware including the cell balancing unit 108 is configured for managing the leak current of all energy storage cells C which are involved in the cell balancing process. The leak current $i_{leak}$ only occurs when a corresponding switch S is in its closed position.

After candidates cells have been selected, the binary strings forms control variables (u). A cell balancing process is to define a particular "cost function", which corresponds to an assumed "cost" associated with the cell balancing process in the form of the total losses due to the leak currents being initiated. The cost function should be minimized in order to obtain a maximum efficiency for the cell balancing process. This corresponds to equation (2):

$$\min \text{cost}(u) \text{ with respect to probability } P \qquad (2)$$

where the term u corresponds to the control variable in the form of a vector, more precisely a binary string with $N_{cells}$ bits, i.e. with the same number of bits as the total amount of cells. The probability P is given by equation 1 a which provides a hard restriction, thus only strings u that passes the probability condition to thereby be part of a candidate group of cells for balancing are used as input in the cost function. In the control variable u, a digit "1" corresponds to a closed switch (a candidate cell for balancing) in a first cell (which generates a leak current) whereas a digit "0" corresponds to an open switch in a further cell (which does not generate any leak current).

In the simplified example disclosed in FIG. 6, it is assumed that all the switches S1-S3 are open (as actually shown in FIG. 6), which would correspond to a control variable according to the following:

$$u=000$$

On the other hand, if it were assumed that a cell balancing process was to be initiated in which the first switch S1 were closed, the control variable would then be:

$$u=100$$

The above-mentioned embodiment is a very simple example and in real life, the number of energy storage cells is the order of 200, which means that the control variable could correspond to a high number of combinations.

Consequently, a control variable u is defined based on an assumption that one or more energy storage cells should be balanced in order to obtain a higher level of balancing for the entire energy storage pack. Each element in the control variable u determines if the switch for a specific energy storage cell shall be on or off. This means that the control variable can be used by the cell balancing module 108 for defining the cells that shall be leaking current. In other words, the string is a "balancing instruction" vector which controls which one(-s) of the switches S that should be closed during cell balancing.

For a given control variable u with selected candidate cells, the above-mentioned cost function should be minimized. This cost function is defined according to equation (3):

$$\cos t(u) = P_{losses} + \varepsilon(SoB(t+\Delta t)) \qquad (3)$$

As mentioned, only control variables u that contains selected candidate energy storage cells are entered into equation (3). The power losses $P_{losses}$ can be described by means of equation (4):

$$P_{losses} = \sum_{i=1...N_{cells}} i_{Rb,i}^2 \cdot R_{b,i} \qquad (4)$$

The power losses $P_{losses}$ correspond to the sum of losses from each cell resulting from a particular current $I_{Rb}$ flowing through a corresponding resistor $R_b$. Also, the cost function contains the term SoB, i.e. the state of balance, which defines how well balanced the energy storage cells are. The lower SoB value, the better the state of balance. This is defined in equation (5):

$$SoB = \max(SoC) - \min(SoC) \qquad (5)$$

This means that the SoB is the difference between the highest and lowest SoC values for the energy storage cells. This definition of SoB is only one option and other definitions may be equally applicable, such as:

$$SoB = \mu_{SoCmax} - \mu_{SoCmin} \qquad (5b)$$

where $\mu_{SoCmax}$ denotes the highest mean value of the state of charge for the energy storage cells, and $\mu_{SoCmin}$ denotes the lowest mean value of the state of charge for the energy storage cells. Since the state of charge may be a statistical variable, the mean of the statistical variable may be used to define the SoB. Other alternatives include to use a normalized SoC whereby the state of charge for each cell is normalized to the maximum state of charge of the cells ($SoC_{j,normalized} = SoC_j/SoC_{max}$) and the state of balance is thus in this case defined as:

$$SoB = (\max(SoC_{j,normalized}) - \min(SoC_{j,normalized})) \qquad (5c).$$

Another possibility is to define the SoB as the standard deviation of the distribution of state of charge of all the cells, i.e. $SoB = \sigma_{SoCAll}$.

The state of balance may also be determined by considering the difference in open circuit voltage in a way similar to the above described definitions.

The cost function also comprises a further term E referred to as the penalty function, which can be defined according to equation (6):

$$\varepsilon(SoB) = \begin{cases} 0 & (SoB \leq SoB_{tar}) \\ \left[(SoB - SoB_{tar}) \cdot \dfrac{P_{lossmax}^{\frac{1}{2}}}{SoB_{tar} \cdot (\alpha - 1)}\right]^2 & (SoB > SoB_{tar}) \end{cases} \qquad (6)$$

Equation (6) contains the term $SoB_{tar}$, which is a threshold value. More precisely, if the SoB value is less than, or equal to, this threshold value $SoB_{tar}$, the term ε is zero. In such a situation, no leak currents are generated for balancing the energy storage pack. The actual value of $SoB_{tar}$ is suitably a few percent and is chosen in order to allow certain minor measurement errors and similar variations. Furthermore, the terms $P_{lossmax}$ and α are used to define how the term ε varies with SoB.

The cost function consequently describes a sum of the total power losses (resulting from the leak currents) and the penalty function (term ε) which depends on the state of balance (SoB). A cell balancing process comprises a step of minimizing the cost function, i.e. first determining the sum of the current losses and the state of balance of the energy storage pack (1), for a given control variable, and then selecting the control variable which leads to the minimized cost function. This particular control variable is then used during a cell balancing process i.e. the bit string which forms part of the control variable u is used by the cell balancing module 108 during a cell balancing process for controlling which switch(-es) of the energy storage cells should be closed and open.

Figure 7:
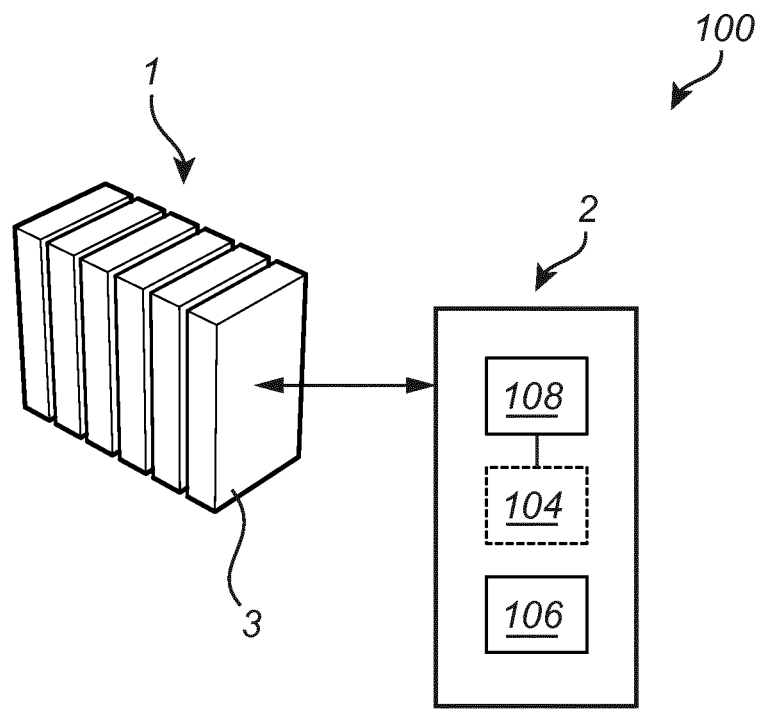
FIG. 7 conceptually illustrates a system according to an embodiment of the invention.

FIG. 7 conceptually illustrates a system according to example embodiments of the invention. The system is adapted to balance an electrical energy storage module 1 comprising a plurality of energy storage cells 3. The system comprises a battery management unit 2, means 104 for determining a state of charge of the energy storage units and means 106 for determining an open circuit voltage of the energy storage units and a control unit 108. The means for determining the open circuit voltage 106 may be a sensor unit in the form of a voltage sensor 106 as described with reference to FIG. 6, and the state of charge may be determined by e.g. an algorithm 104 running on e.g. control unit 108.

The battery management unit 2 may include a microprocessor, microcontroller, programmable digital signal processor or another programmable device. Thus, the battery management unit 2 comprises electronic circuits and connections (not shown) as well as processing circuitry (not shown) such that the battery management unit 2 can communicate with different parts of the bus 1 such as the brakes, suspension, driveline, in particular an electrical engine, an electric machine, a clutch, and a gearbox in order to at least partly operate the bus 1. The battery management unit 2 may comprise modules in either hardware or software, or partially in hardware or software and communicate using known transmission buses such as CAN-bus and/or wireless communication capabilities. The processing circuitry may be a general purpose processor or a specific processor. The battery management unit 2 comprises a non-transistory memory for storing computer program code and data upon. Thus, the skilled addressee realizes that the battery management unit 2 may be embodied by many different constructions.

The system 100 is configured to estimate a state of charge for each of the energy storage cells using the means 104 for determining a state of charge, and to select a group of energy storage cells from the plurality of energy storage cells. Furthermore, the system estimates a future state of charge for each of the energy storage cells in the selected group, the control unit 108 calculates a statistical inaccuracy for each of the estimated future state of charge. The control unit 108 further determines a lower threshold present state of charge among the plurality of energy storage cells, or a higher threshold present state of charge among the plurality of energy storage cells. The control unit 108 calculates a probability that a balancing action on the selected group of energy storage cells results in that at least one of the future state of charge is lower than the lower threshold present state of charge, the probability thereby being indicative of superfluous leakage, the probability being based on the future state of charge for each of the energy storage cells and on the statistical inaccuracy. Alternatively or additionally, the control unit 108 calculates a probability that a balancing action on the selected group of energy storage cells results in that at least one of the future state of charge is higher than the higher threshold present state of charge, the probability thereby being indicative of overcharging for at least one energy storage cell, the probability being based on the future state of charge for each of the energy storage cells and on the statistical inaccuracy. If the probability is indicative of that superfluous leakage or overcharging is unlikely to occur, the control unit 108 selects the group of energy storage cells as candidates for a balancing action.

The system may further comprise a charge unit (not shown) configured to charge the electrical energy storage units 3 of the electrical energy storage module 1. In addition, system may further comprise a discharge unit (not shown in FIG. 7, see FIG. 6) configured to discharge the electrical energy storage units 3 of the electrical energy storage module 1. Such discharge unit is described with reference to FIG. 6 whereby the discharge unit comprises a switch S and a leak resistor R for each energy storage cell. The discharge unit is controlled by the control unit 108. This type of balancing is known in the art as passive balancing. However, the balancing may be performed in various ways known in the art.

A charge unit is configured to direct energy to the energy storage units 3 when it is determined by the battery management unit 2 (e.g. by the control unit 108) that energy is needed for charging the energy storage cells 3 (or individual cells). The charge unit may be adapted to redirect energy from an energy recovery system of the vehicle or to receive energy from a charging station and deliver the received energy to the energy storage units 3.

Figure 8:
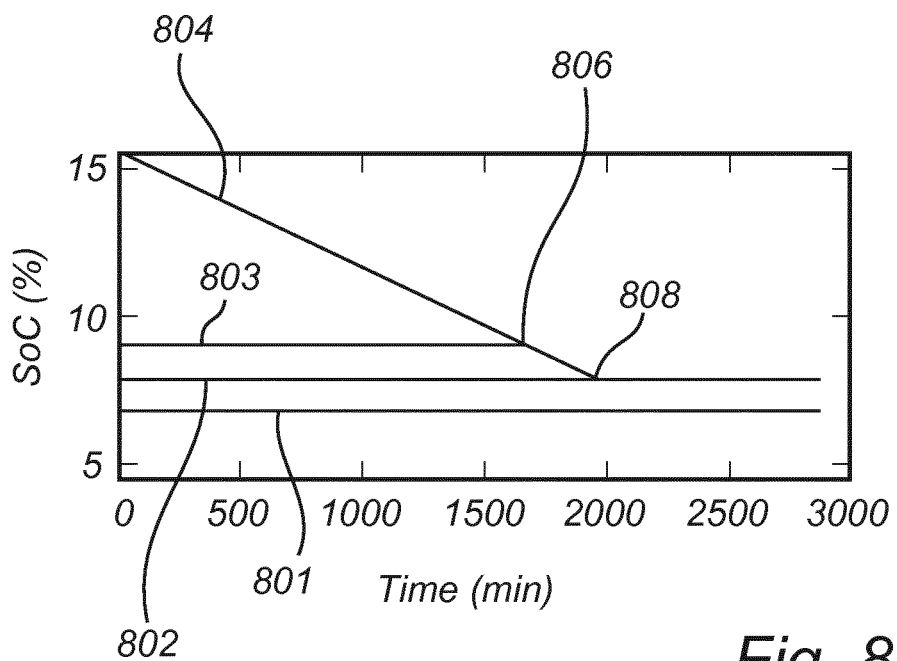
FIG. 8 conceptually illustrates a use-case of balancing a battery pack.

FIG. 8 conceptually illustrates the state of charge versus time for four energy storage cells (e.g. battery cells) undergoing balancing. The example explained with reference to FIG. 8 is highly simplified an in reality a much larger number of energy storage cells are included a mentioned before. At time 0 one of the energy storage cells 804 has a state of charge of about 15% whereas the other energy storage cells 801, 802, 803 has less than 10% state of charge. The minimum state of charge is here the state of charge of energy storage cell 801. A selected group of energy storage cells may in this simplified example be give by the ones ("1") in the binary strings [1 0 0 0], [1 1 0 0], [1 1 1 0], where the cells have been sorted after highest state of charge. Since energy storage cell 804 is being discharged from time 0 to time about 1700 min, at least energy storage cell 804 was selected in a candidate group of energy storage cells. After entering the binary string [1 0 0 0] as a control variable in the cost function (eq. 3) it was determined that cell 804 may be discharged. Note that further groups of energy storage cells, corresponding to e.g. string [1 1 0 0] may have be selected as a group of candidate cells for balancing, but this string may have been rejected for balancing by the cost function. At time about 1700 min (indicated by 806), both cells 804 and 803 have commenced a balancing action. Thus, based on the outcome of the probability of superfluous leakage (eq. 1 a, and e.g. FIG. 2 and FIG. 5) at least the group of energy storage cells corresponding to the binary string [1 1 0 0] was selected as a candidate group. Further groups may also here have been selected as candidates, for example [1 1 1 0], however, this group was rejected for balancing by the cost function. After time about 2000 min indicated by 808, no more balancing is performed.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims. For example, although the present invention has mainly been described in relation to an electrical bus, the invention should be understood to be equally applicable for any type of electrical vehicle.

The invention claimed is:

1. A method for selecting candidate energy storage cells for balancing of an electrical energy storage pack comprising a plurality of energy storage cells for an electric vehicle, said method is characterized by the steps of:
   a) estimating a state of charge for each of said energy storage cells;
   b) selecting a group of energy storage cells from said plurality of energy storage cells;
   c) estimating a future state of charge for each of said energy storage cells in the selected group, said future state of charge resulting from a balancing action of the respective energy storage cell;
   d) calculating a statistical inaccuracy for each of the estimated future state of charge;
   e) determining a lower threshold present state of charge among the plurality of energy storage cells, or determining a higher threshold present state of charge among the plurality of energy storage cells;
   f) calculating a probability that the balancing action on the selected group of energy storage cells results in that at least one of the future state of charge is lower than said lower threshold present state of charge, the probability thereby being indicative of superfluous leakage, said probability being based on said future state of charge for each of said energy storage cells and on said statistical inaccuracy, or
   calculating a probability that the balancing action on the selected group of energy storage cells results in that at least one of the future state of charge is higher than said higher threshold present state of charge, the probability thereby being indicative of overcharging for at least one energy storage cell, said probability being based on said future state of charge for each of said energy storage cells and on said statistical inaccuracy, wherein
   g) if said probability is indicative of that superfluous leakage or overcharging is unlikely to occur, selecting said group of energy storage cells as candidates for a balancing action resulting in candidate storage cells,
   h) repeating steps b) to g) for a further group of energy storage cells, wherein said steps b) to e) are repeated for a plurality of further groups; and
   g) selectively charging or discharging at least one of the candidate storage cells for balancing the electrical energy storage pack.

2. The method according to claim 1, characterized in that said lower threshold present state of charge is the present state of charge of one of the energy storage cells not being in the selected group.

3. The method according to claim 1, characterized in that said lower threshold present state of charge is the minimum present state of charge among said plurality of energy storage cells, and the higher present state of charge is the maximum present state of charge among said plurality of energy storage cells.

4. The method according to claim 1, characterized in that selecting said group of energy storage cells comprises selecting a threshold number of energy storage cells with the highest state of charge.

5. The method according to claim 1, wherein said group of energy storage cells are randomly selected.

6. The method according to claim 1, characterized by:
   creating a binary string comprising ones for selected energy storage cells and zeroes for energy storage cells among the plurality of energy storage cells that are not selected, and
   storing the binary strings that representative of the groups of energy storage cells that are selected as candidates for a balancing action.

7. The method according to claim 1, characterized by:
   calculating an power leak loss for the energy storage pack associated with balancing of the energy storage pack;
   calculating a penalty function indicative of the state of balance for said electrical energy storage pack, said penalty function being proportional to said state of balance for a present state of balance that exceeds a threshold state of balance, minimizing a cost function being a combination of said power leak loss and said penalty function.

8. The method according to claim 7, characterized in that said probability is a constraint for said minimizing of said cost function, whereby only selected groups of energy storage cells for which said probability is indicative of that superfluous leakage is unlikely to occur are used as input for the cost function.

9. The method according to claim 7, characterized by a further step of balancing the energy storage pack according to the cost function.

10. A computer program comprising program code stored on a non-transitory computer readable medium for performing the steps of claim 1 when said program is run on a computer.

11. A non-transitory computer readable medium storing a computer program comprising program code for performing the steps of claim 1 when said program product is run on a computer.

12. A control unit for controlling selecting candidate energy storage cells for balancing of an electrical energy storage pack comprising a plurality of energy storage cells for an electric vehicle, the control unit being configured to perform the steps of the method according to claim 1.

13. A system for selecting candidate energy storage cells for balancing of an electrical energy storage pack comprising a plurality of energy storage cells for an electric vehicle, said system comprising a battery management unit for determining a state of charge of the energy storage cells characterized by the battery management unit being configured to:
   a) estimate a state of charge for each of said energy storage cells;
   b) select a group of energy storage cells from said plurality of energy storage cells;
   c) estimate a future state of charge for each of said energy storage cells in the selected group, said future state of charge resulting from a balancing action of the respective energy storage cell;
   d) calculate a statistical inaccuracy for each of the estimated future state of charge
   e) determine a lower threshold present state of charge among the plurality of energy storage cells, or a higher threshold present state of charge among the plurality of energy storage cells;
   f) calculate a probability that the balancing action on the selected group of energy storage cells results in that at least one of the future state of charge is lower than said lower threshold present state of charge, the probability thereby being indicative of superfluous leakage, said probability being based on said future state of charge for each of said energy storage cells and on said statistical inaccuracy, or
   calculate a probability that the balancing action on the selected group of energy storage cells results in that at least one of the future state of charge is higher than said higher threshold present state of charge, the probability thereby being indicative of overcharging for at least one energy storage cell, said probability being based on said future state of charge for each of said energy storage cells and on said statistical inaccuracy, wherein
   g) if said probability is indicative of that superfluous leakage or overcharging is unlikely to occur, select said group of energy storage cells as candidates for a balancing action, and
   h) repeat steps b) to g) for a further group of energy storage cells, wherein said steps b) to e) are repeated for a plurality of further groups.

14. The system according to claim 13, characterized in that said lower threshold present state of charge is the present state of charge of one of the energy storage cells not being in the selected group.

15. The system according to claim 13, characterized in that said lower threshold present state of charge is the minimum present state of charge among said plurality of energy storage cells.

16. The system according to claim 13, characterized in that to select said group of energy storage cells comprises to select a threshold number of energy storage cells with the highest state of charge.

17. The system according to claim 13, characterized by the battery management unit being configured to:
   create a binary string comprising ones for selected energy storage cells and zeroes for energy storage cells among the plurality of energy storage cells that are not selected, and
   store the binary strings that representative of the groups of energy storage cells that are selected as candidates for a balancing action.

18. The system according to claim 13, characterized by the battery management unit being configured to:
   calculate an power leak loss for the energy storage pack associated with balancing of the energy storage pack;
   calculate a penalty function indicative of the state of balance for said electrical energy storage pack, said penalty function being proportional to said state of balance for a present state of balance that exceeds a threshold state of balance,
   minimize a cost function being a combination of said power leak loss and said penalty function.

19. The system according to claim 18, characterized in that said system further comprise a cell balancing unit configured to:
   discharge selected energy storage cells to balance said energy storage pack to a state of charge level according to said cost function.

20. The system according to claim 13, characterized in that said battery management unit comprises a control unit and an electronic storage unit.

21. A vehicle comprising:
   an electrical energy storage pack comprising a plurality of energy storage cells; and a system according to claim 13.

* * * * *